United States Patent
Schell et al.

(10) Patent No.: US 6,435,824 B1
(45) Date of Patent: Aug. 20, 2002

(54) GAS TURBINE STATIONARY SHROUD MADE OF A CERAMIC FOAM MATERIAL, AND ITS PREPARATION

(75) Inventors: Jerry Donald Schell, Evendale; Curtiss Mitchell Austin; Richard John Grylls, both of Loveland, all of OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/708,823

(22) Filed: Nov. 8, 2000

(51) Int. Cl.$^7$ .............................. F01D 5/20; F01D 11/08
(52) U.S. Cl. ................ 415/174.4; 415/200; 416/241 B; 428/325; 428/328; 428/698
(58) Field of Search .................. 416/241 R, 241 B; 415/200, 174.4, 174.5, 173.5, 173.4, 1; 561/80, 127, 153; 428/325, 328, 404, 698, 446, 553

(56) References Cited

U.S. PATENT DOCUMENTS

| | | | |
|---|---|---|---|
| 4,209,334 A | * 6/1980 | Panzera | 277/937 |
| 4,422,648 A | * 12/1983 | Eaton et al. | 277/415 |
| 4,673,435 A | 6/1987 | Yamaguchi et al. | 75/235 |
| 4,679,981 A | * 7/1987 | Guibert et al. | 415/116 |
| 4,884,820 A | * 12/1989 | Jackson et al. | 415/174.4 |
| 5,059,095 A | * 10/1991 | Kushner et al. | 29/889.21 |
| 5,064,727 A | * 11/1991 | Naik et al. | 415/173.4 |
| 5,080,557 A | * 1/1992 | Berger | 277/411 |
| 5,214,011 A | 5/1993 | Breslin | 501/127 |
| 5,518,061 A | 5/1996 | Newkirk et al. | 164/97 |
| 5,704,759 A | * 1/1998 | Draskovich et al. | 415/170.1 |
| 5,728,638 A | 3/1998 | Strange et al. | 501/127 |
| 5,780,146 A | * 7/1998 | Mason et al. | 428/325 |

* cited by examiner

*Primary Examiner*—Edward K. Look
*Assistant Examiner*—Richard Woo
(74) *Attorney, Agent, or Firm*—David L. Narciso

(57) ABSTRACT

A gas turbine stationary shroud is a curved stationary shroud body having a concave inner gas-path surface and a generally convex back. The curved stationary shroud body is made of an open-cell solid ceramic foam having ceramic cell walls with intracellular volume therebetween. The ceramic foam may be tailored to provide requirement properties. The ceramic adjacent to the gas path surface may be modified to increase or decrease its abrasion resistance, depending upon the design requirements of the stationary shroud. The intracellular volume adjacent to the gas-path surface may be porosity. Some of the ceramic material adjacent to the back of the shroud may be removed, and the intracellular volume adjacent to the back of the shroud may be filled with a nickel-base alloy.

18 Claims, 3 Drawing Sheets

GAS TURBINE STATIONARY SHROUD MADE OF A CERAMIC FOAM MATERIAL, AND ITS PREPARATION

This invention relates to aircraft gas turbines and, more particularly, to the stationary shroud used in such gas turbines.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The turbine blades are mounted on a turbine disk, which rotates on a shaft inside a tunnel defined by a cylindrical structure termed the stationary shroud. (This "stationary shroud" is distinct from the rotating shroud found on some turbine blades.) The hot combustion gases flow from the engine's combustor and into the tunnel. The hot combustion gases pass through the turbine blade structure and cause it to turn. To achieve a high efficiency, it is important that as little as possible of the hot combustion gases leak around the turbine by passing through the clearance between the outermost tip of the turbine blade and the innermost surface of the stationary shroud. However, the sealing of the turbine structure against such leakage presents a problem, because the components of the structure expand and contract differently during the temperature changes of over 2000° F. that are experienced during each cycle of engine operation.

To prevent the leakage of hot combustion gases around the turbine, it is known to size the components so that there is initially a very small gap between the blade tips of the turbine blades and the inner surface of the stationary shroud. As the turbine blades heat and expand when the engine is first operated, there is a contacting between the blade tips and the stationary shroud as the turbine turns. Further contacting between the blade tips and the stationary shroud sometimes occurs again during operation of the engine in the usual operating conditions or under unusual conditions such as application of emergency power or large loads applied to the components.

In these circumstances, material is worn away from the blade tips and/or the stationary shroud, and the clearance gap between the blade tips and the inner surface of the stationary shroud increases. Over time the efficiency of the gas turbine declines because increasing amounts of hot combustion gas leak through the enlarged clearance gap. When the efficiency has decreased by an amount that justifies a repair, the blade tips are repaired by welding new material onto the blade tips to lengthen them back to about their original length, or the stationary shroud is replaced, or both.

The repairs and/or replacements are operable, but they may be costly and there is a decrease in gas turbine efficiency until such time as the repairs and/or replacements are made. There is therefore a need for an improved approach to retaining turbine efficiency in gas turbine engines.

BRIEF SUMMARY OF THE INVENTION

The present invention provides a stationary shroud used in a gas turbine engine. The stationary shroud achieves the same sealing function as a conventional stationary shroud, but it is more resistant to heat-induced damage. The present approach is highly versatile. The abrasion or abradability properties of the stationary shroud may be established by control of its composition and structure. That is, it may be made abradable so that the stationary shroud is worn away and the turbine blade tip is affected in a lesser way, or it may be made highly abrasive so that the turbine blade tip is worn away and the stationary shroud is affected in a lesser way. The stationary shroud is compatible with conventional attachment procedures.

A gas turbine stationary shroud comprises a curved stationary shroud body having a concave inner gas-path surface and a generally convex back. The curved stationary shroud body comprises an open-cell solid ceramic foam made of ceramic cell walls having intracellular volume therebetween.

The properties of the ceramic foam may be varied widely according to the requirements of the gas-path surface and the back. At least a portion of the intracellular volume is filled with a metal, such as a nickel-base alloy. Another portion of the intracellular volume may be filled with a material to modify the abradability of the ceramic foam material. Other portions of the intracellular volume may be empty space, or "porous". In a typical case, the ceramic comprises a base ceramic material consisting of aluminum oxide. The stationary shroud desirably comprises at least about 60 volume percent, more preferably from about 60 to about 80 volume percent, of the ceramic. To increase the abrasiveness of the gas-path surface, the ceramic may have an abrasive ceramic mixed with the base ceramic, where the abrasive ceramic is more abrasive than the base ceramic. To decrease the abrasiveness of the gas-path surface, or alternatively stated to increase its abradability, an abradable ceramic may be mixed with the base ceramic, where the abradable ceramic is more abradable than the base ceramic.

In one embodiment, the stationary shroud comprises a support region adjacent to a portion of the generally convex back, with the intracellular volume of the support region being filled with a nickel-base alloy. There is a gas-path region adjacent to the gas-path surface, with the intracellular volume of the gas-path region being porosity. A source of a cooling gas may communicate with the gas-path region at a location remote from the gas-path surface, so that cooling gas flows outwardly through the porosity in the gas-path region.

In another embodiment, the intracellular volume of the support region is filled with a nickel-base alloy, and the intracellular volume of the gas-path region is filled with a metal whose abrasiveness is greater than that of the nickel-base alloy.

In yet another embodiment, the ceramic cell walls of the gas-path region occupy a gas-path-region ceramic volume fraction, and the ceramic cell walls of the support region occupying a support-region ceramic volume fraction that is less than the gas-path-region ceramic volume fraction.

The present approach is compatible with conventional attachment procedures used for stationary shrouds. An attachment integral with the support region is usually provided for this purpose. The embodiment having a reduced support-region ceramic volume fraction is preferred for this application to reduce the abrasiveness of the stationary shroud so that it does not wear away the stationary shroud support.

The stationary shroud is preferably prepared by providing a piece of a sacrificial ceramic having the shape of the shroud, and contacting the piece of the sacrificial ceramic with a reactive metal which reacts with the sacrificial ceramic to form the ceramic foam. The resulting ceramic foam may be further processed to the various embodiments, typically by removing some of the ceramic cell walls and/or removing/replacing the intracellular metal in the required locations.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
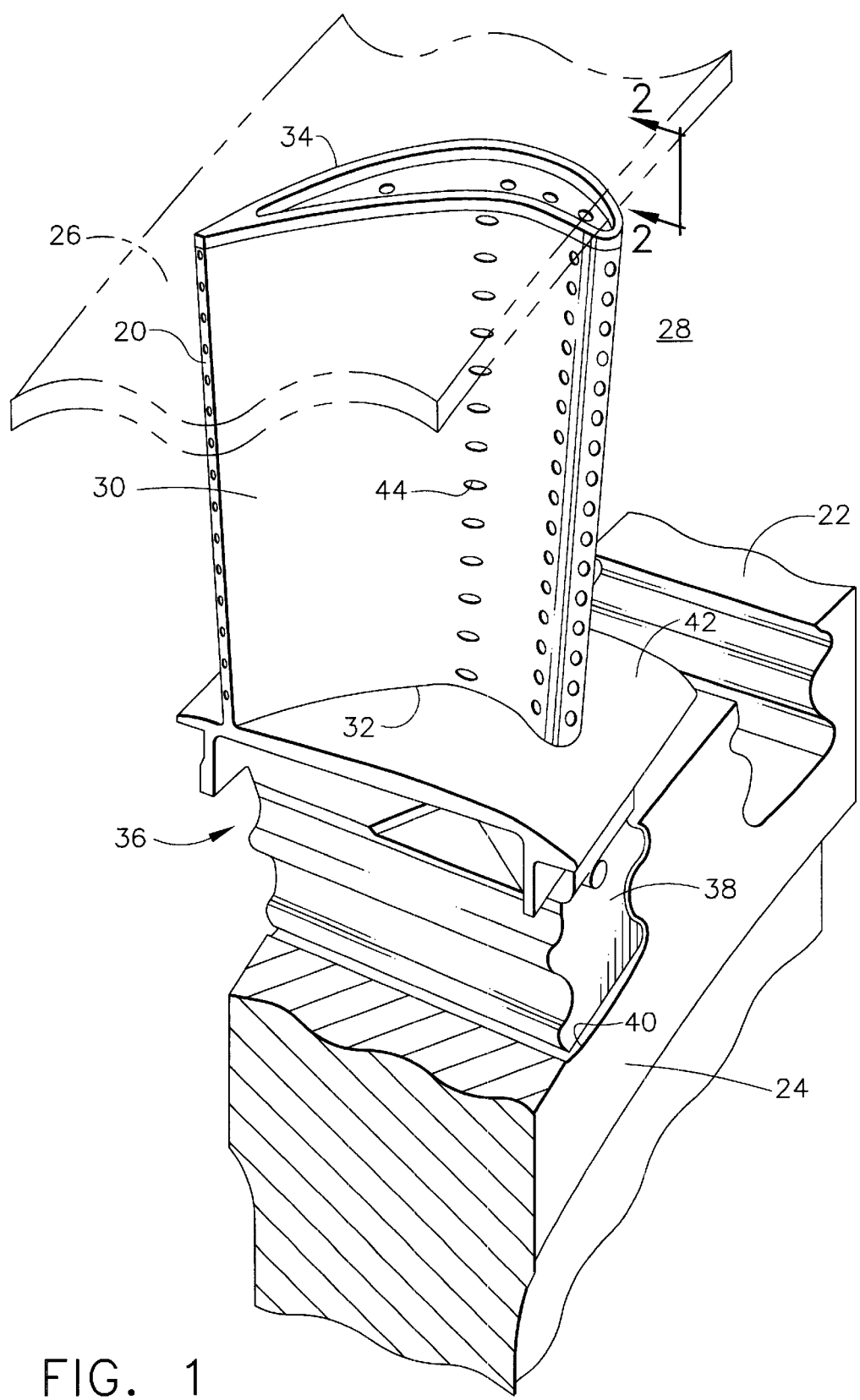
FIG. 1 is a perspective view of a turbine blade adjacent to a portion of a stationary shroud.

FIG. 1 depicts a turbine blade 20 mounted to a periphery 22 of a turbine disk 24. There are a large number of turbine blades 20 mounted to the turbine disk 24, but only one is illustrated. The turbine disk 24 rotates on a turbine shaft (not shown) positioned along its centerline. As the turbine disk 24 rotates, the turbine blade 20 sweeps through an annular volume between the turbine disk 24 and a stationary shroud structure 26, a portion of the circumference of which is shown in FIG. 1. The shroud structure 26 in its entirety defines a tunnel 28 in which the turbine disk 24, turbine shaft, and turbine blades 20 rotate.

The turbine blade 20 includes an airfoil section 30 having a root end 32 and a tip end 34. There is an attachment 36 at the root end 32 of the airfoil section 30. In this case, the attachment 36 is a dovetail 38 which extends downwardly from the airfoil section 30 and engages a slot 40 in the turbine disk 24. The attachment 36 may instead be a bonded joint between the turbine blade 20 and the turbine disk 24, or the attachment 36 may be an integral construction (i.e., a BLISK) of the turbine blade 20 and the turbine disk 24. A platform 42 extends laterally outwardly from the area where the airfoil section 30 is joined to the dovetail 38. Optionally, a number of internal passages extend through the interior of the airfoil section 30, ending in openings 44 in the surface of the airfoil section 30. A flow of cooling air is directed through the internal passages, to remove heat from the airfoil section 30. The turbine blade 20 is typically made of a nickel-base superalloy.

Figure 2:
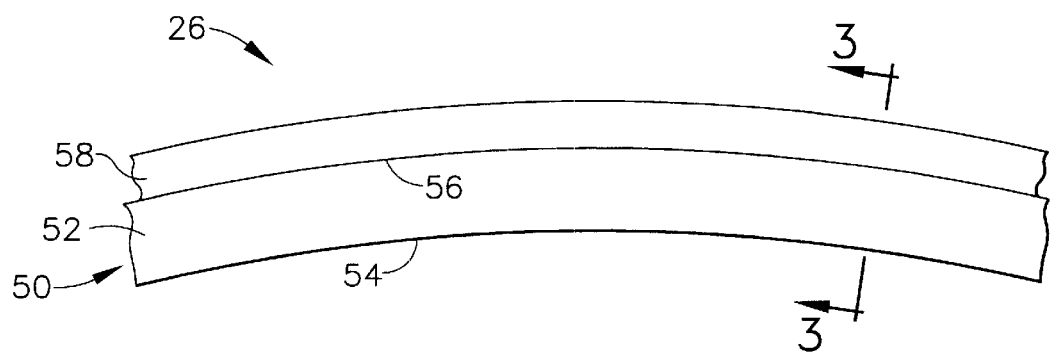
FIG. 2 is an enlarged section view of the shroud structure, taken on line 2—2 of FIG. 1.
Figure 3:
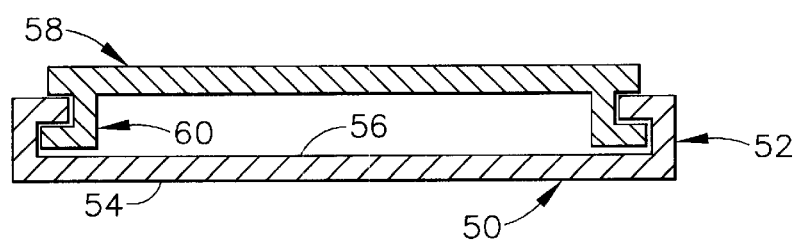
FIG. 3 is a sectional view of the shroud structure, taken on line 3—3 of FIG. 2, showing the attachment between the stationary shroud and the shroud support.

The shroud structure 26 is shown in greater detail in FIG. 2. The shroud structure 26 may be a single piece construction, but more typically it is formed of two pieces that are loosely joined together so that thermal strains may be accommodated. The shroud structure 26 includes a stationary shroud 50 in the form of a curved stationary shroud body 52 having a concave inner gas-path surface 54 and a generally convex back 56. (The element 50 is termed a "stationary shroud" because it is not part of the turbine blades and because it forms the generally cylindrical tunnel around the turbine disk and blade structure. Other shrouds are thereby distinguished.) The stationary shroud 50 is loosely attached to a shroud support 58 by an attachment 60 extending from the shroud back 56 as seen in FIG. 3. The illustrated attachment 60 is a loose set of hooks in form, but other types of attachments may be used.

Figure 4:
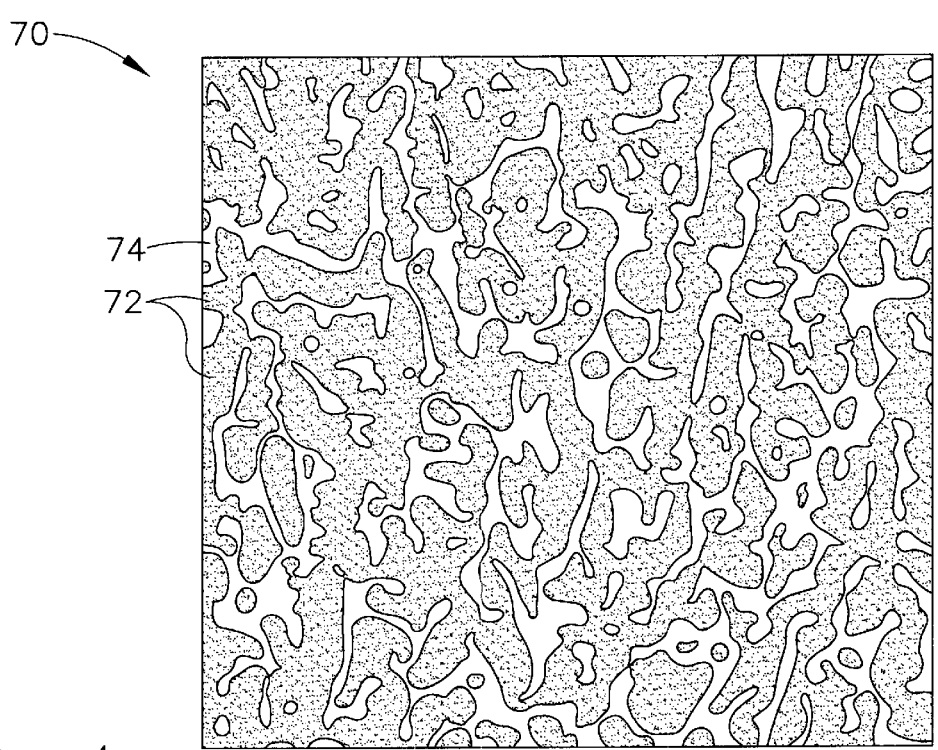
FIG. 4 is an idealized microstructure of the open-cell ceramic material used in the stationary shroud.

As illustrated in FIG. 4, the stationary shroud body 52 of the stationary shroud 26 comprises an open-cell solid ceramic foam 70 made of ceramic cell walls 72 having intracellular volume 74 therebetween. The ceramic cell walls 72 are continuous through the volume of the ceramic foam 70. As is implicit in the term "open-cell", the intracellular volume 74 is also continuous. That is, the ceramic foam 70 is formed of two interpenetrating, continuous regions: the ceramic of the cell walls 72 and the intracellular volume 74. In the preferred embodiment, the ceramic phase that forms the cell walls 72 occupies at least about 60 volume percent of the ceramic foam 70, most preferably from about 60 to about 80 volume percent of the ceramic foam 70. The intracellular volume 74 occupies the remainder of the ceramic foam 70. Because the intracellular volume 74 occupies less than half of the total volume, it is difficult to see from a planar microstructure such as FIG. 4 that the intracellular volumes 74 are interconnected, but such is the case.

The ceramic material that forms the cell walls 72 of the ceramic foam 70 may be any operable ceramic. The preferred ceramic material is aluminum oxide ("alumina"). Aluminum oxide is of particular interest because it is much less dense than nickel-base superalloys, reducing the weight of the material. The ceramic material may be a mix of ceramics, with the ceramic that is present in the largest volume fraction being the "base ceramic".

One or more modifying ceramics may be mixed with the base ceramic to alter its properties. There are two alternative approaches for the wearing interaction between the turbine blade 20 and the stationary shroud 50. In a first approach, the blade tip end 34 is abrasive and the gas-path surface 54 of the stationary shroud 50 is abradable. That is, when the turbine blade 20 contacts to the stationary shroud 50, primarily the stationary shroud 50 is worn away. When the structure is refurbished, the stationary shroud 50 is replaced or repaired in this first approach. In a second approach, the blade tip end 34 is abradable and the gas-path surface 54 of the stationary shroud 50 is abrasive. That is, when the turbine blade 20 contacts to the stationary shroud 50, primarily the blade tip 34 is worn away. When the structure is refurbished, the turbine blade 20 is replaced or repaired in this second approach. In most current designs, the first approach is followed, because the labyrinth gas seal formed when the stationary shroud wears away is more efficient at maintaining operating efficiency, and because it is less costly to refurbish the stationary shroud 50 than the turbine blade 20.

Both of these approaches may be implemented using the structure of the stationary shroud 50 of the present invention. The ceramic material of the cell walls 72 may be made more abrasive or more abradable by the use of proper modifying ceramics. The intracellular volume 74 may be made more abrasive or more abradable by selection of a material to fill the intracellular volume 74 or by making the intracellular volume porous. These techniques will now be discussed in greater detail.

Any compatible modifying ceramic may be used to achieve particular properties in the ceramic phase of the cell walls 72, with the modifying ceramic present in an operable amount. For example, the modifying ceramic may be a ceramic material that is more abrasive than the base ceramic. Examples of abrasive-modifying ceramics that are more abrasive than aluminum oxide and may be mixed with the aluminum oxide base ceramic are cubic boron nitride and sol gel alumina. The modifying ceramic may be a ceramic material that is less abrasive-that is, more abradable-than the base ceramic. Some examples of abradable modifying ceramics that are more abradable than aluminum oxide and may be mixed with the aluminum oxide base ceramic include silicon nitride and silicon carbide. The relative amounts of the modifying ceramics are selected according to the amount of modification desired.

The intracellular volume 74 may contain another solid material, or it may contain no solid material. In the latter case, it may be considered a void or porosity (although it would contain air). The intracellular volume 74 may contain a metal, such as a nickel-base metal or an aluminum-base metal. It may contain a hard material that is relatively abrasive, such as an intermetallic compound or a refractory metal alloy, or it may contain a soft metal that is relatively abradable, such as the aluminum-base metal. As used herein, a disclosure of a metal within the intracellular volume 74 includes both the pure form of the metal and its alloys. For example, "nickel" includes pure nickel and nickel-base alloys. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

Figure 5:
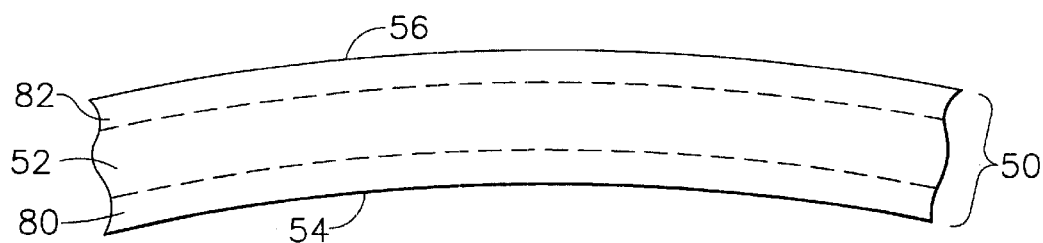
FIG. 5 is a schematic sectional illustration of regions within the stationary shroud.

An important advantage of the use of the open-cell ceramic foam is that there are a number of structural variations that may be produced which are particularly valuable in a stationary shroud. FIG. 5 illustrates regions of the stationary shroud 50, including a gas-path region 80 adjacent to the gas-path surface 54, and a support region 82 adjacent to the generally convex back 56. The open-cell solid ceramic foam such as shown in FIG. 4 forms all of the stationary shroud 50, including the gas-path region 80 and the support region 82, but it may have structural variations adapted to specific requirements of these regions as discussed next.

In one variation, the intracellular volume 74 of the gas-path region 80 is filled with a relatively abrasive metal such as a heavy metal or a composite material of a metal matrix containing abrasive particles, to increase the abrasion and decrease the abradability at the gas-path surface 54. In another variation, the intracellular volume 74 of the gas-path region 80 is empty and porous, to decrease the abrasion and increase the abradability at the gas-path surface 54. This type of structure may result where the intracellular volume 74 of the gas-path region 80 is initially filled with a metal, and the metal is removed by melting or vaporization during service, leaving the ceramic cell walls 72. It may also result from intentionally removing metal from the intracellular volume 74 of the gas-path region 80 during fabrication of the stationary shroud 50, as by leaching out the metal. The structure produced by this variation, having a porous intracellular volume 74 in the gas-path region 80, has the important additional advantage that the porous ceramic structure serves as a thermal barrier to the heat entering the gas-path region 80 through the gas-path surface 54. That heat may originate from both the contact of the hot exhaust gas and also the occasional frictional contact between the blade tip 34 and the gas-path surface 54 of the stationary shroud 50.

In another variation, the ceramic cell walls 72 of the ceramic foam 70, in at least the gas-path region 80, are formed of a base ceramic such as aluminum oxide mixed with a modifying ceramic such as a ceramic that is more abrasive than aluminum oxide as discussed earlier, to increase the abrasion at the gas-path surface 54. In another variation, the ceramic cell walls 72 of the ceramic foam 70, in at least the gas-path region 80, are formed of a base ceramic such as aluminum oxide mixed with a modifying ceramic such as a ceramic that is more abradable than aluminum oxide as discussed earlier, to increase the abradability at the gas-path surface 54.

The structure of the support region 82 may also be varied in a similar fashion. In general, it is desirable that this support region 82 adjacent to the shroud back 56 be less abrasive so that it does not overly wear the attachment 60 and lead to a failure between the stationary shroud 50 and the shroud support 58. Thus, for example, only the portion of the support region 82 adjacent to the attachment 60 might be specially processed to reduces its abrasiveness. Any of the variations of the preceding paragraph may be used in relation to the support region 82, although those which decrease abrasion are preferred. In yet another variation, the relative amount of ceramic in the support region 82 may be reduced below that found in the gas-path region 80. In this embodiment, the ceramic cell walls 72 of the support region 82 occupy a support-region ceramic volume fraction (of the support region) that is less than a gas-path-region ceramic volume fraction of the ceramic cell walls 72 of the gas-path region 80. The result is a lower fraction of ceramic facing the shroud back 56, with less potential to abrade the shroud support 58 and damage it during service.

Figure 6:
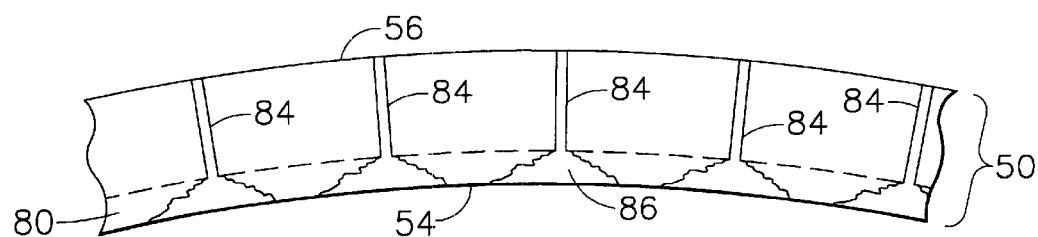
FIG. 6 is a schematic sectional illustration of the use of cooling gas to cool the stationary shroud.

The use of a porous intracellular volume 74, at least in the gas-path region 80, offers another important benefit in the cooling of the gas-path surface 54 and the gas-path region 80 (as well as the entire stationary shroud 50). As illustrated in FIG. 6, cooling gas passages 84 may be formed from the shroud back 56 through the stationary shroud 50 to the internal portion of the gas-path region 80. Cooling gas may be forced through these passages 84 and into the porosity of the gas-path region 80. The cooling gas cools the shroud back 56, and diffuses through the porosity of the intracellular volume 74 of the gas-path region 80 to form plumes 86 that emerge from the gas-path surface 54 and carry heat away from the stationary shroud 50.

Figure 7:
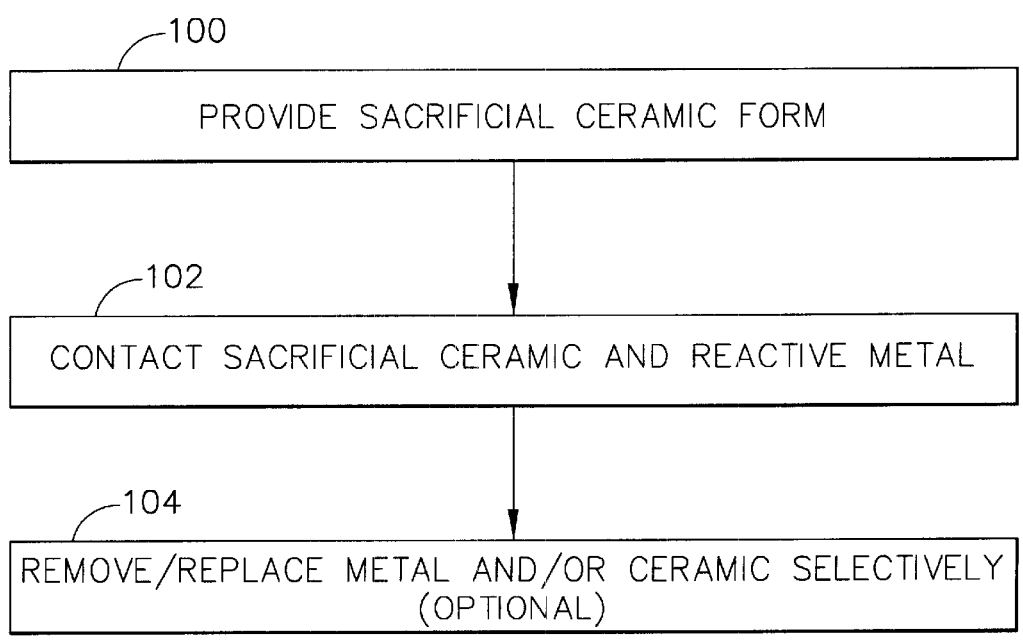
FIG. 7 is a block flow diagram of an approach for practicing the invention.

FIG. 7 illustrates a preferred approach for preparing a stationary shroud 50. The stationary shroud 50 is preferably prepared using modifications and additions to the general approach disclosed in U.S. Pat. Nos. 5,214,011 and 5,728, 638, whose disclosures are incorporated by reference. A sacrificial precursor ceramic form is prepared in the shape and size of the stationary shroud, numeral 100. The sacrificial ceramic form is preferably made of silicon dioxide (silica) by slip casting silica particles or other operable technique, and then fired to consolidate and fuse the silica particles. The sacrificial ceramic form is thereafter contacted to a reactive metal, numeral 102, most preferably aluminum. The reactive metal may optionally be mixed with nonreactive metals such as a large fraction of nickel and other elements of the nickel-base alloy of interest for some applications, as disclosed in the '638 patent.

While the sacrificial ceramic form is contacted to the reactive metal, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and internal fracturing and discussed in the '011 patent, the foam or sponge structure is formed throughout the ceramic as it transforms from the sacrificial form-composition to the final composition. The intracellular volume that results is filled with the metal used in the reaction process.

Portions of the ceramic and/or the metal may optionally be removed or replaced, numeral 104, as might be necessary for particular structures. The metal in the intracellular volume 74 may be chemically removed by etching in an appropriate chemical or by an electrochemical process. For example, aluminum may be removed by reaction with HCl or NaOH solutions. Some of the ceramic that forms the cell walls 72 may be chemically removed. For example, aluminum oxide may be removed by alkaline solutions such as KOH or NaOH, where aluminum in the intracellular volume 74 has been previously replaced by a nickel-base alloy (as discussed next).

Portions of the aluminum metal in the intracellular volume 74 may be replaced by immersing the aluminum/aluminum oxide composite material into a bath of the replacement liquid metal, such as nickel-base or copper-base alloys. The composite material is maintained in the replacement liquid metal for a period of time, which depends upon the thickness of the composite material. This immersion allows diffusion to take place such that the aluminum is replaced by the liquid replacement metal from the bath. As an example, the aluminum/aluminum oxide composite material may be immersed in a nickel-base alloy for 8 hours at 1600° C. to effect the substantial complete replacement of the aluminum phase by the nickel-base alloy.

An advantage of the present invention is that the size, shape, and/or dimensions of the shroud 50, as well as its precursor structures, may be adjusted as necessary at any of several steps in the process. For example, the slip-cast-and-fired sacrificial shroud precursor material of step 100, which is silica in the preferred embodiment, may be reshape or resized by glass shaping techniques or machining. After the contacting step 102 or the removal/replacement step 104, the shroud may be coarse machined and/or fine machined to adjust its size and dimensions, or to add detail features.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A gas turbine stationary shroud comprising a curved stationary shroud body having a concave inner gas-path surface and a generally convex back, the curved stationary shroud body comprising an open-cell solid ceramic foam made of ceramic cell walls having intracellular volume therebetween.

2. The stationary shroud of claim 1, wherein at least a portion of the intracellular volume is filled with a metal.

3. The stationary shroud of claim 1, wherein at least a portion of the intracellular volume is filled with a nickel-base alloy.

4. The stationary shroud of claim 1, wherein the ceramic comprises an aluminum oxide base ceramic material.

5. The stationary shroud of claim 1, wherein the ceramic has an abrasive ceramic mixed with a base ceramic, the abrasive ceramic being more abrasive than the base ceramic.

6. The stationary shroud of claim 1, wherein the ceramic has an abradable ceramic mixed with a base ceramic, the abradable ceramic being more abradable than the base ceramic.

7. The stationary shroud of claim 1, wherein the stationary shroud comprises at least about 60 volume percent of ceramic.

8. The stationary shroud of claim 1, wherein the stationary shroud comprises from about 60 to about 80 percent by volume of ceramic.

9. The stationary shroud of claim 1, wherein the stationary shroud comprises
   a support region adjacent to the generally convex back, the intracellular volume of the support region being filled with a nickel-base alloy, and
   a gas-path region adjacent to the gas-path surface, the intracellular volume of the gas-path region being porosity.

10. The stationary shroud of claim 9, further including
    a source of a cooling gas communicating with the gas-path region at a location remote from the gas-path surface.

11. The stationary shroud of claim 1, wherein the stationary shroud comprises
    a support region adjacent to the generally convex back, the intracellular volume of the support region being filled with a nickel-base alloy, and
    a gas-path region adjacent to the gas-path surface, the intracellular volume of the gas-path region being filled with a metal whose hardness is greater than that of the nickel-base alloy.

12. The stationary shroud of claim 1, wherein the stationary shroud comprises
    a gas-path region adjacent to the gas-path surface, the ceramic cell walls of the gas-path region occupying a gas-path-region ceramic volume fraction, and
    a support region adjacent to the generally convex back, the ceramic cell walls of the support region occupying a support-region ceramic volume fraction that is less than the gas-path-region ceramic volume fraction.

13. The stationary shroud of claim 12, further including an attachment integral with the support region.

14. A gas turbine stationary shroud comprises a curved stationary shroud body having a concave inner gas-path surface and a generally convex back, the curved stationary shroud body comprising an open-cell solid ceramic foam made of ceramic cell walls having intracellular volume therebetween, wherein the stationary shroud comprises
    a support region adjacent to the generally convex back, the intracellular volume of the support region being filled with a metal; and
    a gas-path region adjacent to the gas-path surface, the intracellular volume of the gas-path region being porosity.

15. The stationary shroud of claim 14, wherein
    the ceramic cell walls of the gas-path region occupying a gas-path-region ceramic volume fraction, and
    the ceramic cell walls of the support region occupying a support-region ceramic volume fraction that is less than the gas-path-region ceramic volume fraction.

16. A method of preparing a gas turbine stationary shroud of a ceramic foam having ceramic cell walls and an intracellular volume between the ceramic cell walls filled with an intracellular metal, by steps that include providing a piece of a sacrificial ceramic having the shape of the shroud, and contacting the piece of the sacrificial ceramic with a reactive metal which reacts with the sacrificial ceramic to form the ceramic foam comprising the ceramic cell walls of an oxidized ceramic of the reactive metal, and the reactive metal in the intracellular volume.

17. The method of claim 16, including a further step, after the step of preparing, of removing at least a portion of at least one of the ceramic cell walls and the intracellular metal.

18. The method of claim 16, including a further step, after the step of preparing, of replacing at least a portion of the intracellular metal.

* * * * *